United States Patent [19]

Warner

[11] Patent Number: 4,997,562
[45] Date of Patent: Mar. 5, 1991

[54] MULTI-CHAMBERED SEPTIC TANK WITH ELONGATED PARTITION CROSSOVER CONDUITS

[76] Inventor: Lloyd S. Warner, 8007 Rickard Rd., Plain City, Ohio 43064

[21] Appl. No.: 319,330

[22] Filed: Mar. 6, 1989

[51] Int. Cl.⁵ .............................................. B01D 21/02
[52] U.S. Cl. .................................. 210/259; 210/305; 210/320; 210/532.2
[58] Field of Search ............... 210/170, 259, 299, 305, 210/320, 522, 532.2

[56] References Cited

U.S. PATENT DOCUMENTS

| | | | |
|---|---|---|---|
| 357,349 | 2/1887 | Waring | 210/532.1 |
| 592,721 | 10/1897 | Barnhart et al. | 137/573 |
| 745,754 | 12/1903 | Adams | 210/320 |
| 791,647 | 6/1905 | Pfautz | 210/301 |
| 874,542 | 12/1907 | Russell | 210/532.2 |
| 875,984 | 1/1908 | Commin | 210/299 |
| 1,160,918 | 11/1915 | Linden | 210/305 |
| 1,179,327 | 4/1916 | Kearney | 210/305 |
| 1,454,723 | 5/1923 | Burtis | 210/259 |
| 1,456,312 | 5/1923 | Imhoff | 210/299 |
| 1,582,915 | 5/1926 | Farley | 210/532.2 |
| 1,708,118 | 4/1929 | Carpenter et al. | 210/532.2 |
| 3,109,813 | 11/1963 | Bergsten et al. | 210/532.2 |
| 3,228,531 | 1/1966 | Proudman | 210/532.2 |
| 3,261,779 | 7/1966 | Sullins et al. | 210/617 |
| 3,325,016 | 6/1967 | Angst | 210/502.1 |
| 3,428,551 | 2/1969 | Dawe | 210/502.1 |
| 3,805,957 | 4/1974 | Oldham et al. | 210/98 |
| 3,883,427 | 5/1975 | Oldham et al. | 210/776 |
| 3,904,524 | 11/1975 | Pelton et al. | 210/94 |
| 3,945,918 | 3/1976 | Kirk | 210/703 |
| 4,073,722 | 2/1978 | Grutsch et al. | 210/624 |
| 4,230,422 | 10/1980 | Brown et al. | 405/210 |
| 4,238,333 | 12/1980 | Tidwell | 210/800 |
| 4,325,823 | 4/1982 | Graham | 210/86 |
| 4,481,114 | 11/1984 | Riiuse | 210/702 |
| 4,505,813 | 3/1985 | Graves | 210/86 |

FOREIGN PATENT DOCUMENTS

| | | |
|---|---|---|
| 39560 | 5/1909 | Austria . |
| 240412 | 10/1987 | European Pat. Off. . |
| 26986 | 8/1902 | Switzerland . |
| 11900 | of 1904 | United Kingdom . |

Primary Examiner—W. Gary Jones
Assistant Examiner—Christopher Upton
Attorney, Agent, or Firm—Porter, Wright, Morris & Arthur

[57] ABSTRACT

Five relatively spaced apart, internal partitions separate the subject septic tank into four consecutive settling chambers, a filtration chamber and an outlet chamber. Each of the four partitions separating the settling and filtration chambers is provided with a conduit having a connective section mounted in an upper portion of the partition at least two-thirds of the distance from the bottom to the top of the septic tank and with a leg section extending downwardly from the connective section. Each leg section has a lower opening communicating with a lower portion of one of the chambers at least two-thirds of the distance from the top to the bottom to the septic tank.

11 Claims, 3 Drawing Sheets

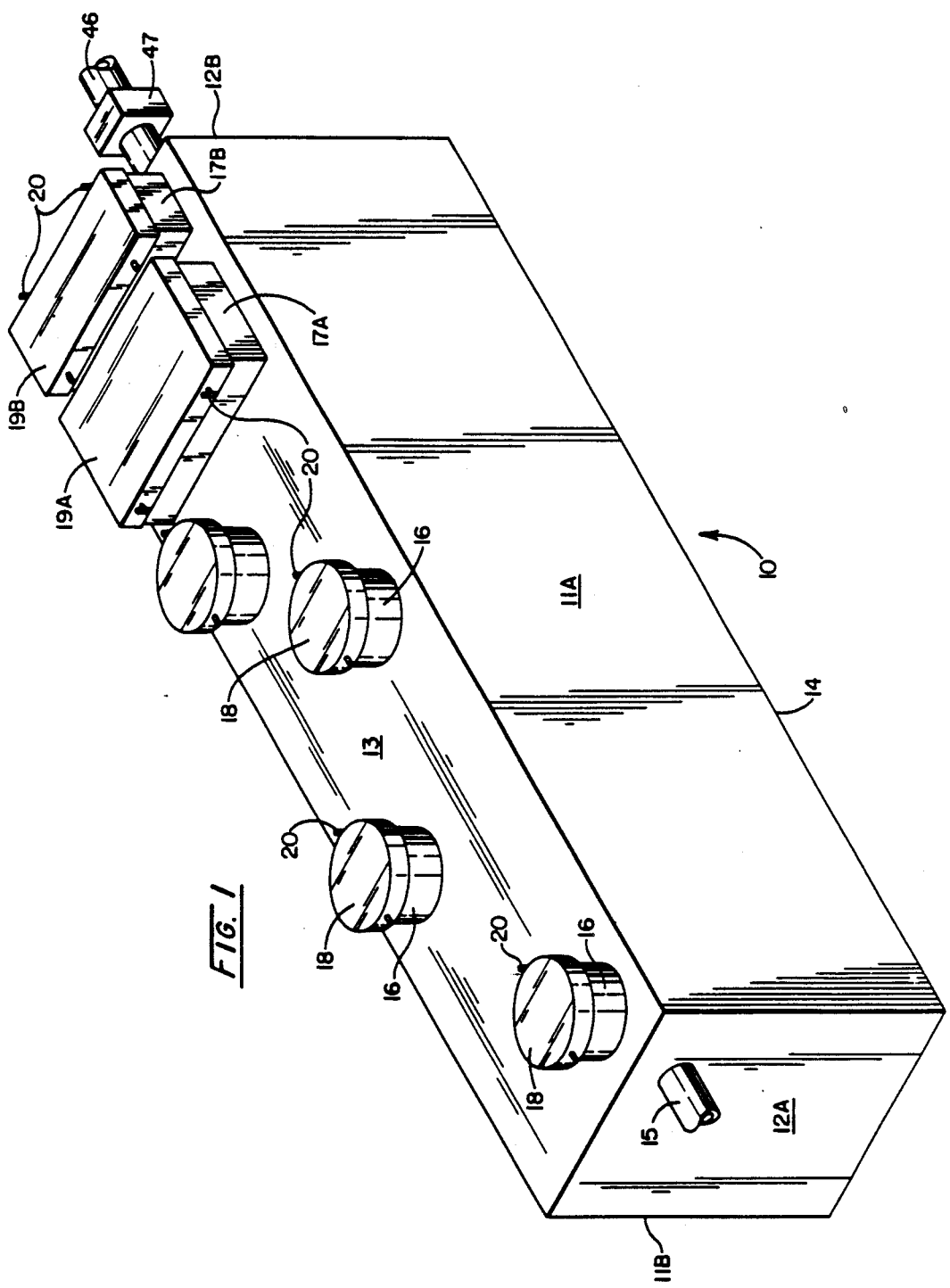

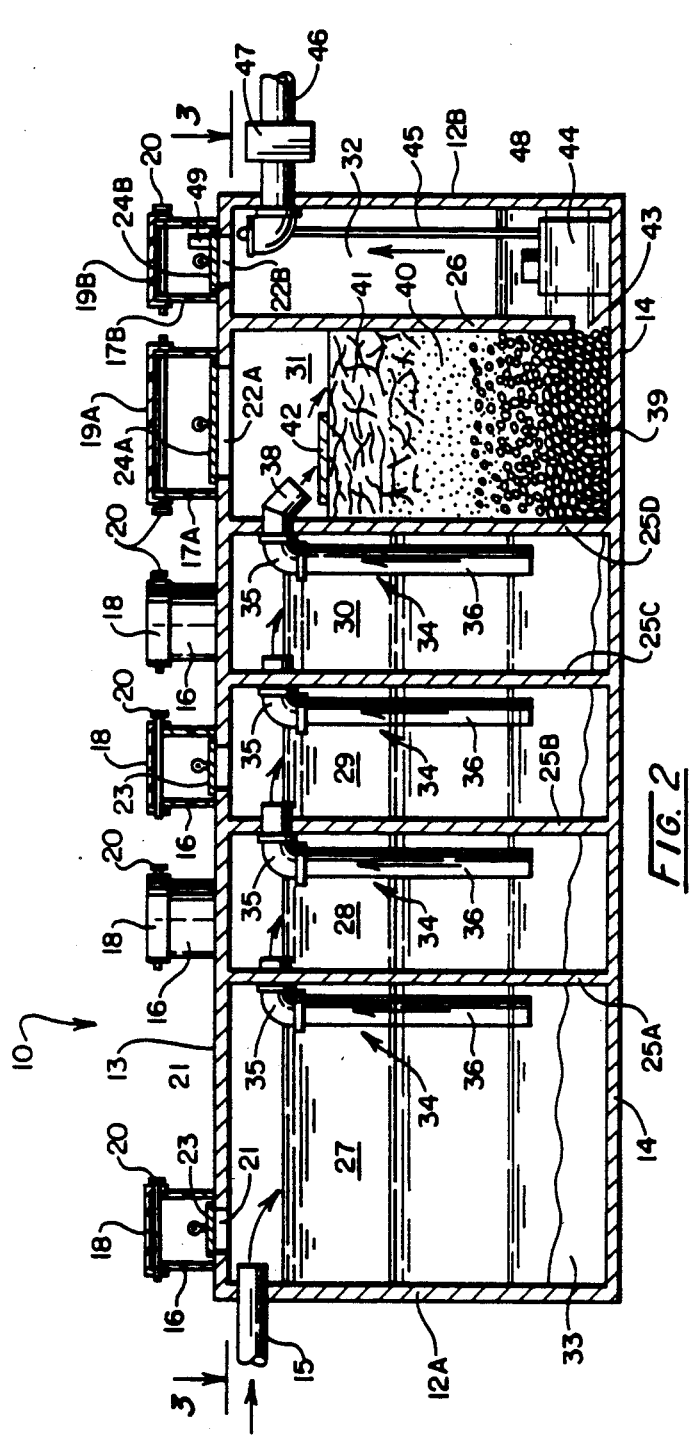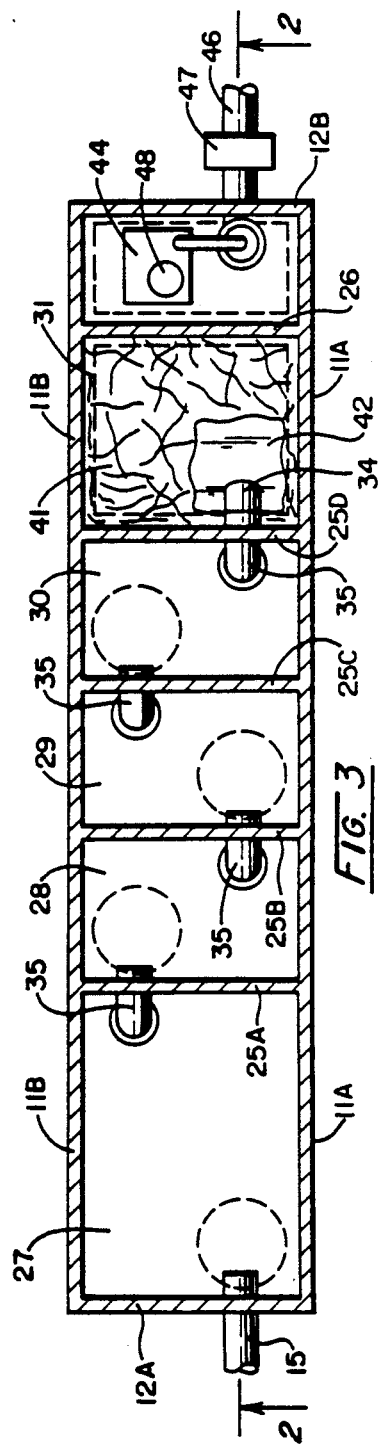

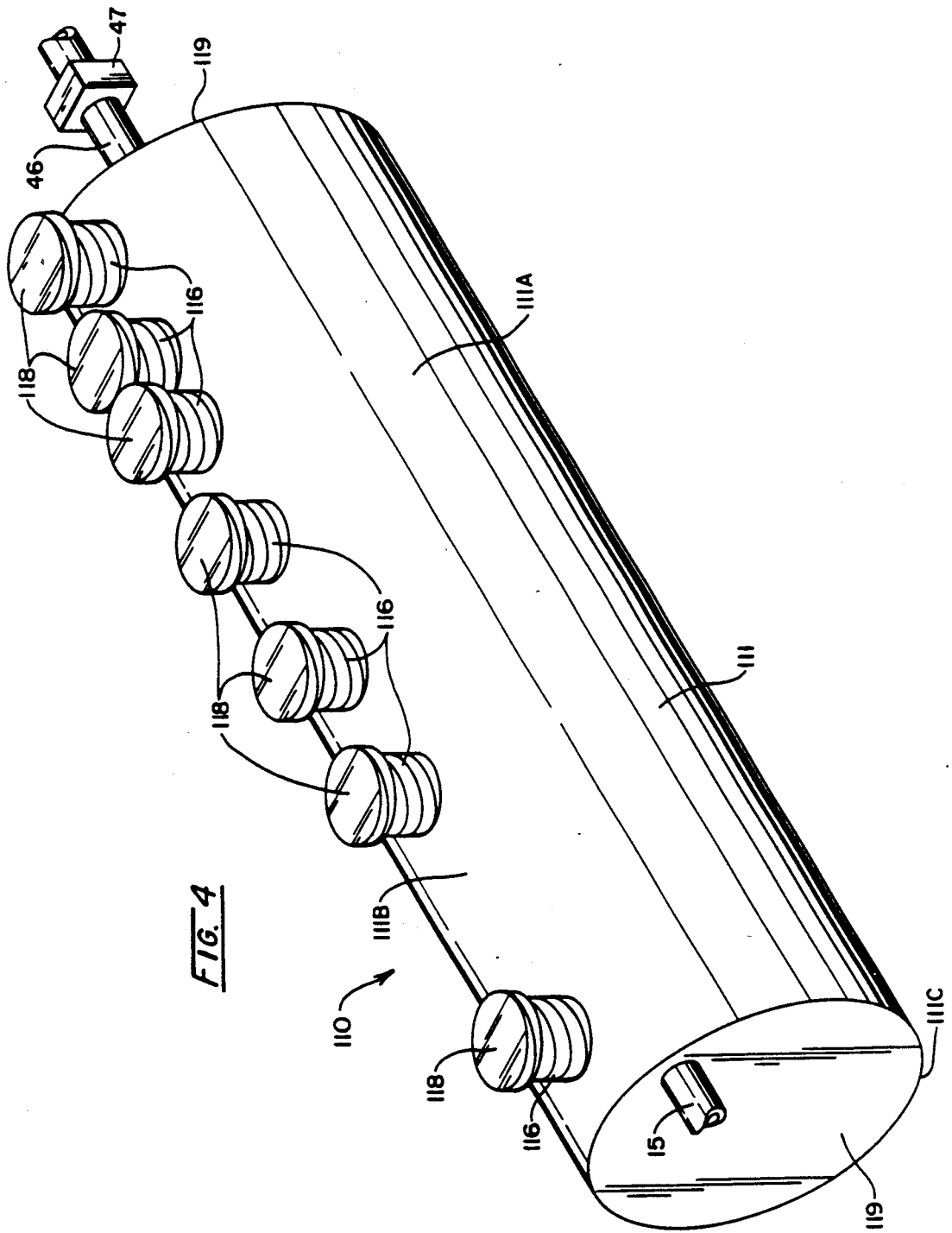

4,997,562

MULTI-CHAMBERED SEPTIC TANK WITH ELONGATED PARTITION CROSSOVER CONDUITS

TECHNICAL FIELD

The present invention relates to septic tanks for detoxifying residential wastewater and more particularly to those equipped with at least two settling chambers separated by a partition.

BACKGROUND ART

Practically since the first was invented, septic tanks have permitted improperly processed wastewater to escape when the tank was not regularly cleaned. If not removed on time, sludge inevitably accumulated to the point where the settling process became significantly impaired.

Various attempts have been made in the past to cause sludge to settle at the bottom of the septic tank. U.S. Pat. No. 3,261,779 to Sullins et al discloses a multi-compartmented septic tank provided with conduits that conveyed material from the top of one chamber to the bottom of the next via a conduit extending through a partition wall and downwardly into the next chamber. U.S. Pat. No. 4,325,823 to Grahm discloses a multi-chambered septic tank provided with a baffle extending downwardly from the top thereof in proximity to one of the partition walls. U.S. Pat. No. 4,505,813 to Graves discloses a relatively short partition or baffle extending downwardly from the top of one of the chambers adjacent to an opening in one of the partition walls. The passageways disclosed in these references were, among other reasons, provided to prevent sludge from reaching the final clarification chamber. However, sludge would tend to build up in the first few chambers, rendering them ineffective at trapping sludge and increasing the concentration of sludge in ensuing chambers. It was quite possible for sludge to reach the leach bed into which the output of the septic tank was fed, thereby creating potential harm to the environment.

Thus, the present inventor was faced with the problems of providing a multi-compartmented septic tank with means for preventing a damaging build-up of sludge and for ensuring that the output of the septic tank is properly decontaminated whenever operating.

SUMMARY AND OBJECTS OF THE INVENTION

The present invention is an improvement in a septic tank equipped with at least two chambers separated by an internal partition extending generally vertically between relatively spaced apart upper and lower chamber-defining members. The improvement comprises a conduit formed with a connective section disposed in an upper portion of the partition at least two-thirds of the distance from the lower chamber-defining member to the upper chamber-defining member and with a leg section extending downwardly from one end of the connective section, said leg section having a lower opening communicating with a lower portion of one of the chambers at least two-thirds of the distance from the upper to the lower chamber-defining member. Preferably, three relatively spaced apart internal partitions are each provided with one of the conduits to define first, second, third and fourth settling chambers. In addition, fourth and fifth partitions are preferably provided to define a filtration chamber and a final holding chamber.

A primary object of the present invention is to provide a septic tank which will automatically halt the inflow of wastewater once sludge builds up in the settling chambers, rather than permit improperly processed effluent to be released into the environment. Another object of the present invention is to provide a septic tank which is relatively inexpensive to build, yet is durable and relatively simple to maintain. Further objects and advantages may become more readily apparent in view of the following drawings and description of the preferred embodiment.

BRIEF DESCRIPTION OF THE DRAWING

FIG. 1 is a perspective view of the exterior of a septic tank embodying the present invention and particularly illustrates the arrangement of the external access openings to the various chambers;

FIG. 2 is a vertical sectional view of the present septic tank taken along 2—2 of FIG. 3 and particularly illustrates the preferred details of construction of the various chambers and partition-mounted conduits;

FIG. 3 is a horizontal sectional view of the present septic tank taken along line 3—3 of FIG. 2 and particularly illustrates the alignment between the staggered conduits and the chamber access openings; and FIG. 4 is a perspective view of the exterior of an alternative embodiment of the present invention.

DETAILED DESCRIPTION OF THE PREFERRED EMBODIMENT

Reference is herein made to the drawings, wherein substantially identical parts are designated by the same number.

As illustrated in FIGS. 1-3, the present septic tank generally designated 10 is an elongated, multi-chambered structure having chamber-defining side walls (11A, 11B), end walls (12A, 12B), upper wall 13, and lower wall 14. Preferably, all of these exterior walls 11-14 are formed from PVC or other substantially inert material. Typically, the tank 10 is mounted on a concrete or stone bed provided at the bottom of a cavity which is at least sufficiently deep to permit a wastewater infeed pipe 15 from the house to enter an upper portion of the upstream end wall 12A. A strap or other anchoring device (not shown) may be used to hold the septic tank in place on the bed. Four relatively spaced apart cylindrical risers 16 and a pair of rectangular risers 17A, 17B project upwardly from the upper chamber-defining wall 13. Each riser 16, 17A-B is provided with an overlying cap 18, 19A-B, respectively, and with a cap latching mechanism, such as a rod 20. The cylindrical and rectangular risers or sleeves 16, 17A-B are formed from PVC or other inert synthetic resin material and project upwardly sufficiently for the caps 18, 19A-B to be flush with or slightly above ground level. Preferably, and as indicated in FIG. 1, the risers 16 are arranged in staggered fashion for reasons explained below. Alternatively, one or two cylindrical risers may replace each of the rectangular risers 17A, 17B. Each of the risers 16, 17A-B is mounted over a separate access opening 21, 22A-B in the upper chamber-defining wall 13, and a concrete coverplate 23, 24A-B is movably mounted thereon.

Five relatively spaced apart partitions 25A-D and 26 extend generally vertically between the upper and lower chamber-defining walls 13, 14 and transversely between the vertical side walls 11A, 11B of the tank to define six consecutively arranged chambers 27-32. Preferably, the partitions are formed from PVC or other inert synthetic resin sheet material. The first, second, third and fourth chambers 27-30, respectively, are settling chambers. The fifth chamber 31 is a filtration chamber, and the sixth chamber 32 is an outlet or final holding chamber.

The inlet or infeed pipe 15 enters the first settling chamber 27 through the entrant end wall 12A just below the top wall 13. Each of the four settling chambers 27-30 provides conditions in which sludge 33 tends to settle on the base or lower wall 14 of the tank.

Each of the three partitions 25A-C that separate the four settling chambers 27-30 from one another is provided with a one-legged conduit or baffle, generally designated 34. Each conduit 34 is formed with a connective or transverse section 35 extending through or otherwise disposed in an upper portion of the partition 25 at least two-thirds of the distance from the lower 14 to the upper 13 chamber-defining member and with an elongated leg section 36. The leg section 36 extends downwardly into the chamber from an input end of the connective section 35 and is provided with a lower opening 37 which communicates with a lower portion of the settling chamber at least two-thirds of the distance from the upper 13 to the lower 14 chamber-defining wall.

Accordingly, the conduit 34 mounted on the first partition 25A provides fluid communication between the first and second settling chambers 27, 28. The conduit 34 mounted on the second partition 25B provides fluid communication between the second and third settling chambers 28, 29, and likewise for the conduits mounted on the third and fourth partitions. In this manner, wastewater is conveyed from the first chamber 27 to the second chamber 28 and hence to the chambers downstream thereof in consecutive fashion.

As indicated in FIG. 3, the one-legged conduits 34 are preferably arranged in staggered fashion and in generally vertical alignment with the access openings 21, 22A for each of the second 28, third 29, fourth 30 and fifth 31 chambers. Advantageously, the connective sections 35 are accessible through the openings 21, 22A so that a flexible cable can be inserted into each conduit for cleaning.

If desired, the present septic tank may be modularly constructed, wherein each of the chambers 27-32 is formed separately. Upon assembly, the connective sections 35 would extend through the partition(s) separating adjacent chamber modules.

Preferably, the first settling chambers 27 is approximately twice as large as the three downstream settling chambers 29-31, to compensate for the relatively greater build-up of sludge 33 in the first chamber.

It may be noted that the connective or transverse sections 35 of all four conduits are disposed at approximately the same height in their respective partition walls. As a result, the water levels in each of the settling chambers 27-30 tend to be approximately equal. Wastewater entering the initial chamber 27 via the infeed pipe 15 raises the water level therein, thereby raising the water level in the leg 36 and connective section 35 of the first conduit 34. The connective section 35 of each conduit is mounted in its respective partition 25A-D slightly below the level at which the infeed pipe 15 enters the side wall 12A of the first chamber 27. In this manner, the water level in the first chamber 27 is able to rise to a maximum level before it spills over, via the connective section 35, into the second chamber 28. Likewise, the second chamber fills to a maximum level before water spills over into the third chamber 29, and subsequently into the fourth chamber 30. Since the water level in each chamber is, in effect, determined by the position of the connective sections 35, said connective sections are disposed as high on the partition walls as possible, so that the volume of water in each chamber is maximized.

By extending each conduit leg downwardly at least two-thirds of the distance from the top wall 13 to the bottom wall 14, floating material and solid material suspended in upper portions of each settling chamber do not reach the open end 37 of the leg 36 and are thus confined to one settling chamber until they decompose sufficiently to migrate to the bottom of the chamber. Furthermore, since wastewater enters the top of each chamber via either the infeed pipe 15 or the connective sections 35, the wastewater at the bottom of each settling chamber remains relatively calm, thereby permitting the solid material 33 to settle properly.

By extending the leg 36 at least two-thirds of the distance to the bottom of the chamber, excessive build-up of the sludge 33 is prevented. This is accomplished because, if the sludge 33 is permitted to accumulate until it blocks the opening 37 in the leg 36, fluid cannot pass freely through the conduit 34 into the next chamber. The water level in the chamber with the constriction or blockage then rises to the point where wastewater in the upstream chamber will not flow into it. Eventually, the water level in the initial settling chamber 27 rises above the inlet pipe 15 so that wastewater cannot flow from the dwelling to the septic tank. At this point, the user must clean out the sludge 33 in order to restore operation.

The cleanout process is accomplished by means of the access equipment provided on each chamber. Each of the access openings 21 for the settling chambers 27-30 is sufficiently large to accommodate a conventional, flexible tube, (not shown) which, when extended to the bottom of the chamber, provides means by which the sludge may be pumped out and disposed of properly. Advantageously, an access opening 21 is positioned over each of the conduit connective sections 35. In this manner, a snake or other device for unclogging pipes may be introduced into the conduit or, if necessary, the feed pipe 15, thereby releasing any sludge of other solid material restricting or occluding these passageways.

Immediately downstream of the fourth settling chamber is the filtration chamber 31. The filtration chamber is equipped with a short elbow 38 which is connected to and turned downwardly from the connective section 35 extending through an upper portion of the partition wall 25D. Preferably, the filtration chamber 31 is somewhat larger than the adjacent settling chamber 30 and is provided with a bottom layer of gravel or aggregate 39, an intermediate layer of sand 40 and an overlying layer of peat moss or other fibrous organic material 41. A flat stone 42 or other relatively durable plate-like structure is placed on top of the peat moss directly below elbow 38. In this manner, relatively clarified wastewater from the final settling chamber strikes the deflector 42 before reaching the peat moss 41, thereby diffusing and deflecting the water over a larger area instead of boring through a relatively small portion thereof. Since the amount of sludge which is permitted to accumulate in the settling chambers is minimal and since multiple settling chambers are provided, thereby further reducing the amount of sludge which carries over between settling chambers, the wastewater entering the filtration chamber is substantially rid of particulate material sufficiently massive to settle out. Further, by providing the additional settling chambers, the time provided for the solid matter to settle is increased. The filtration chamber, in turn, further eliminates impurities suspended in the wastewater, the peat moss 41 and sand 40 being particularly well adapted for this purpose. Advantageously, the peat moss also helps to eliminate odors. The aggregate bed 39 supports the peat moss and sand further filters the effluent. As indicated in FIG. 2, the aggregate layer 39 extends above a gap 43 provided in the partition 26 between the filtration chamber 31 and the outlet chamber 32. The clarified, filtered and deodorized effluent enters the outlet chamber 32 immediately upon trickling through the gravel, so there is minimal back pressure in the filtration chamber 31. Further, the base opening or gap 43 permits the water level in the filtration chamber to be independent of the water level in the settling chambers. Preferably, the access opening 22A for the filtration chamber 31 is larger than the access openings for the settling chambers 27–30 in order to facilitate periodic removal and replacement of saturated peat moss 41 and sand 40.

The outlet chamber 32 includes a removable pump 44 operatively resting upon the tank base 14, an outlet conduit 45 extending upwardly from the pump 44 and an outlet pipe 46 extending through an upper portion of the outer septic tank wall 12B. Preferably, an external chlorinating unit 47 is mounted on the outlet pipe 46, and a float-actuated switch 48 is mounted on the pump 44 to activate the pump when the water level in the outlet chamber 32 reaches a desired level. In order to optimize the effectiveness of the filtering media, the water level in the final chamber is usually kept relatively low to reduce back pressure in the filter chamber 31. Like the filtration chamber, the outlet chamber 32 is preferably provided with an enlarged access opening 22B to facilitate the installation and removal of the pump 44. An electrical junction box 49 (FIG. 2) may be mounted advantageously upon the cover plate 24B so that insulated electrical wiring (not shown) extending to the pump 44 and float valve 48 is readily accessible. It is recommended that a bed of sand or other material meeting governmental requirements be provided downstream of the present septic tank to receive the effluent from the outlet pipe 47.

FIG. 4 illustrates an alternative embodiment of the present septic tank generally designated 110, wherein a sleeve-shaped tank body 111 is integrally formed with exterior side 111A, top 111B and bottom 111C portions. Preferably, the tank body 111 is formed from glass fiber reinforced synthetic resin material, and is similar in size and exterior construction to a conventional underground gasoline storage tank. Interior partition walls (not shown) are disposed in fluid-tight engagement with the side, top and bottom portions 111A–C within the confines of the sleeve 111 and are positioned in the manner shown in FIGS. 2 and 3 with respect to the partition walls 25A–D and 26 of the tank 10. The tank body is also provided with input and output conduits, chambers, filtration media, pump and chlorinator substantially as shown in FIGS. 2 and 3. Once the conduits and partition walls are mounted in the tank body end walls 119 are sealed thereon.

A plurality of generally linearly aligned risers 116 project upwardly from openings formed in the top portion 111B of the tank body 111 and provide access to the chambers defined by and conduits mounted upon the partition walls. Preferably, a pair of risers 116 and associated access openings are provided for the filtration chamber to facilitate removal and replacement of the filter media. Plastic caps 118 snap fit onto the free open ends of the risers 116.

Thus it may be seen that the present invention comprises a septic tank which enhances the wastewater detoxification process by preventing the build-up of sludge, providing extensive settling time, filtering out suspended particles and odors, preventing backflow of fully processed effluent, and removing bacteria by chlorination.

While alternative embodiments of the present invention has been illustrated and described in some detail, the foregoing disclosure is not intended to limit unduly the spirit of the invention or the scope of the following claims.

I claim:

1. In a septic tank equipped with at least two chambers disposed in upstream or downstream relation to one another, adjacent chambers being separated by a partition extending generally vertically and completely between relatively spaced apart upper and lower chamber-defining members, that improvement which comprises: a self-contained conduit formed with a transverse section extending through an upper portion of the partition at least two-thirds of the distance from the lower chamber-defining member to the upper chamber-defining member, said transverse section communicating with an outlet opening in the downstream chamber, and with a leg section extending downwardly from the transverse section, said leg having an inlet opening disposed in the upstream chamber at least two-thirds of the distance from the upper to the lower chamber-defining member wherein said inlet opening and said partition are constructed and arranged to provide a means for halting an inflow of wastewater into said septic tank when a level of sludge in said upstream chamber blocks said inlet opening.

2. The septic tank according to claim 1, wherein four relatively spaced apart generally identical partitions are provided, each of said partitions being provided with one of the conduits.

3. The septic tank according to claim 2, wherein first, second, third and fourth settling chambers and a filtration chamber are separated, respectively, by said four partitions, all of said settling and filtration chambers being generally equal in depth.

4. A septic tank according the claim 3, wherein a fifth partition is provided in spaced relation to the fourth partition to separate the filtering chamber from an outlet chamber.

5. A septic tank according to claim 4, wherein a passageway is provided in the fifth partition adjacent to the lower chamber-defining member for fluid communication between the filtration chamber and the outlet chamber.

6. A septic tank according to claim 4, wherein said filtering chamber is filled in substantial part with a fibrous organic filtering medium.

7. A septic tank according to claim 4, wherein said filtering chamber is larger than each of the second, third and fourth settling chambers.

8. A septic tank according to claim 4, wherein the outlet chamber is provided with means for pumping an effluent which collects therein out of the septic tank.

9. A septic tank according to claim 4, wherein the upper chamber-defining member is formed with at least one access opening for each chamber.

10. A septic tank according to claim 9, wherein an open-ended riser is vertically aligned with and projects upwardly from each of said access openings.

11. A septic tank according to claim 9, wherein a portion of the connective section of each conduit is generally vertically aligned with one of the access openings.

* * * * *